Dec. 20, 1960   B. REGOLI ET AL   2,965,730
SAFETY CUTOFF VALVE WITH INDICATOR SWITCH
Filed Dec. 22, 1958   2 Sheets-Sheet 1

United States Patent Office 2,965,730
Patented Dec. 20, 1960

2,965,730

SAFETY CUTOFF VALVE WITH INDICATOR SWITCH

Bengasi Regoli and Carlo Di Stefano, both of 732D, Via Flaminia, Rome, Italy

Filed Dec. 22, 1958, Ser. No. 782,072

Claims priority, application Italy Dec. 21, 1957

13 Claims. (Cl. 200—82)

This invention is concerned with a protection device against failures of pipes or containers for liquid or gaseous fluids under pressure, and more particularly against failures of hydraulic brakes on a vehicle, the device operating as soon as a failure occurs.

For the sake of simplicity and clearness the device of the invention will be described hereinafter as used in connection with hydraulic brakes on a vehicle, but this use should not be taken in a limiting sense, since the device may advantageously be used for other purposes in engineering apparatus and industrial plant.

Referring then to hydraulic brakes, it is well known that when a conventional hydraulic brake for one motor vehicle wheel is broken, all the oil, or other fluid, in the whole brake apparatus flows away, and there is no possibility whatever to stop the vehicle.

The device of the invention provides a means for avoiding the danger caused by a failure of one hydraulic brake on a motor vehicle by preventing the brake hydraulic fluid from flowing away and affording the driver a possibility to operate the brakes which are still effective.

The device according to the invention will be described hereinafter with reference to the accompanying drawings, in which.

Figure 1:
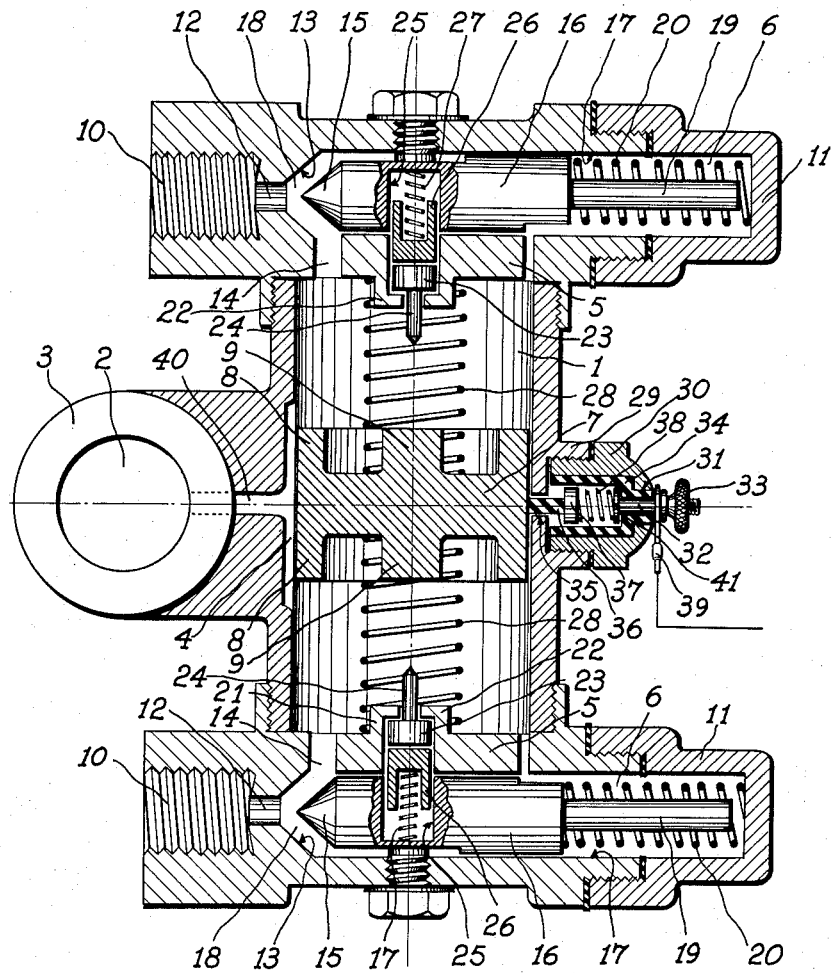
Fig. 1 is a sectional view of one embodiment of the invention.

With reference to Fig. 1, the device of the invention comprises a main hollow cylindrical body 1, from the middle of the outer surface of which a large nozzle 2 communicating with the inside of said body extends outwardly and is provided with a flange 3 for direct connection to the main cylinder of the pump (not shown) feeding hydraulic fluid to the brake assembly or to a pipe which may provide a connection with said pump in fluid tight relationship. In the inner surface of the portion of the cylindrical wall of the hollow body 1 wherefrom nozzle 2 projects, a wide groove 4 extends lengthwise, a hole 40 being provided in the middle of groove 4 for communication with the inside of nozzle 2.

The ends of body 1 are each closed by a bottom 5 which is partly incorporated in the wall of a cylindrical chamber 6 whose geometrical axis is at right angles with the axis of body 1.

Slidably mounted in the main cylindrical body 1 is a disc or piston member 7 with an annular rib or flange 8 projecting axially or lengthwise from the circumference of each face of disc 7, the extent of annular ribs 8 being such that when disc 7 is equally spaced from both bottoms 5, the edge of each rib 8 will leave an end portion of groove 4 uncovered. Moreover, a pin or central protrusion 9 projects from each face of disc 7; the two pins 9 are of the same size, and they project from the faces of disc 7 substantially to the same extent as ribs 8. Each pin 9 is surrounded by a spiral spring 28, one end of which abuts on one face of disc 7, and the other end on the opposite bottom 5 of main body 1.

The two chambers 6 are of the same size and are similarly positioned, and therefore, we will only refer to one of them in the following description, it being understood that the same applies to the other chamber.

Chamber 6 has a spout 10 at one end, and is closed by a bottom 11 at the other end. At the center of the bottom of spout 10 there is the orifice of a bore 12, the other orifice being the smaller base of a wall 13 shaped as a frustum of cone axially extending from chamber 6 and having its larger base adjacent an aperture 14 for communication of the main body 1 with chamber 6. A conical point 15 is also coaxial with chamber 6, and its generating lines form the same angle as those of wall 13 with the axis. The conical point 15 and wall 13 are suitably spaced. Point 15 is one of the ends of a pin 16 which may slide within the cylindrical space 17 of chamber 6, this space following room 18, which is shaped as a frustum of cone, between wall 13 and point 15; pin 16 is shorter than the cylindrical space 17, and carries a shank 19 at the other end, a narrow gap remaining between bottom 11 of chamber 6 and the free end of shank 19. A spiral spring 20 abutting on said end of pin 16 and bottom 11 surrounds shank 19. A small sleeve 21 extends axially from that portion of bottom 5 which is incorporated with the cylindrical wall of chamber 6 into the main body 1, sleeve 21 being provided with a bottom 22 having a central hole. Slidably mounted in sleeve 21 is a disc 23 provided with a pin 24 which projects through a hole in bottom 22 into main body 1. A blind bore or hole 25 is provided in pin 16, exactly facing the orifice of sleeve 21, in such a way that hole 25 and sleeve 21 together form a closed cylindrical hollow wherein a cap or trigger member 26 is housed, the bottom of which engages the base of disc 23 within sleeve 21, and almost all of its annular portion is within hole 25, its end being slightly spaced from the bottom of the latter. One end of a spiral spring 27 is received in cap 26, the other end of said spring abutting on the bottom of hole 25.

From the cylindrical wall of main body 1, an annular rib 29 projects in a diametrically opposed direction to nozzle 2. Rib 29 is closed by a cap 30 having a hole 31 in the middle, wherein pin 32 of an electric terminal 33 is placed, with the interpositioning of an insulating member 34, this member also lining the whole surface of the inside of cap 30. A small disc 41, the diameter of which is substantially the same as the diameter of said hollow, is fixed to the inner end of pin 32, and can slide in said hollow.

Another hole 35 is provided in the cylindrical wall of main body 1 co-axially with hole 31, and a small rod or shaft 36 of an insulating material can slide in hole 35. Rod 36 abuts on the periphery of disc 7 with its end extending toward the inside of body 1, the other end extending into said hollow a short distance and carrying a metal disc or head 37 having substantially the same diameter as said hollow. Between discs 37 and 41 a spiral spring 38 is interposed, this spring biasing insulating rod 36 against the periphery of disc 7. A wire 39 from terminal 33 leads to one terminal of a battery, not shown, the other terminal of which is connected to a pilot lamp, also not shown, which is grounded.

The operation of the device of the invention is as follows:

As already mentioned, the device is set up on a motor vehicle by connecting nozzle 2 to the outlet of the pump for the hydraulic fluid of the brake assembly. Then one spout 10 is connected to a pipe which supplies the hydraulic fluid to the two front wheels, and the other spout 10 is connected to a similar pipe which supplies the hydraulic fluid to the back wheels.

In the normal operation of the brake assembly, oil or other fluid under pressure enters nozzle 2 and, passing through bore 40 and the two uncovered end portions of groove 4, it fills all the empty inner room of the main body 1 and exerts the same pressure on both faces of disc 7, this disc being kept in the middle of said body by the two springs 28. The hydraulic fluid reaches, through the truncated-cone spaces 18, spouts 10 and via said two pipes the four brake cylinders. Should a failure of one brake occur, the hydraulic fluid will flow away from it, and the pressures on the two faces of disc 7 will be unbalanced, since the pressure on the face of the disc opposite spout 10 which feeds the damaged brake will be nearly zero, while the normal fluid pressure will be still exerted on the other face of the disc. The pressure on the latter face, therefore, will suddenly push the disc toward the spout 10 which communicates with the cylinder of the damaged brake, against the action of spring 28, and central pin 9 on the face whereon no pressure is exerted will strike the corresponding pin 24, whereby cap 26 will overcome the action of spring 27 and will be wholly inserted in hole 25 in pin 16, until the outer surface of its bottom is flush with the outer surface of pin 16. At this point, the hindrance constituted by cap 26 being removed, pin 16 pushed by spring 20, will suddenly move toward hole 12 and fully close this hole with its conical point 15 which will exactly fit in the truncated-cone wall 13 in fluid tight relationship therewith, any communication whatever of nozzle 2 with the spout 10 referred to in this instance being thus prevented. The hydraulic fluid in the damaged brake cylinder will flow away, while the substantial amount which remains in the brake assembly will still be available for a proper operation of the two brakes of the motor vehicle which are connected to the other spout 10.

Moreover, as a result of said movement of disc 7 toward one bottom 5, the respective annular rib 8 will go beyond hole 35, and consequently, insulating rod 36, no longer held by the outer cylindrical surface of disc 7 and annular ribs 8, will project into the main body 1, owing to the action of spring 38, to the same extent as the portion of cap 30 it occupies in its idle position. Thus, metal disc 37 will come into contact with the metal wall of main body 1, completing a circuit for the lamp which will be lighted; moreover, insulating rod 36 projecting into main body 1 will stop disc 7 and prevent it from returning to a position where it might uncover the portion of groove 4 extending toward the cylindrical chamber connected with the damaged brake.

Figure 2:
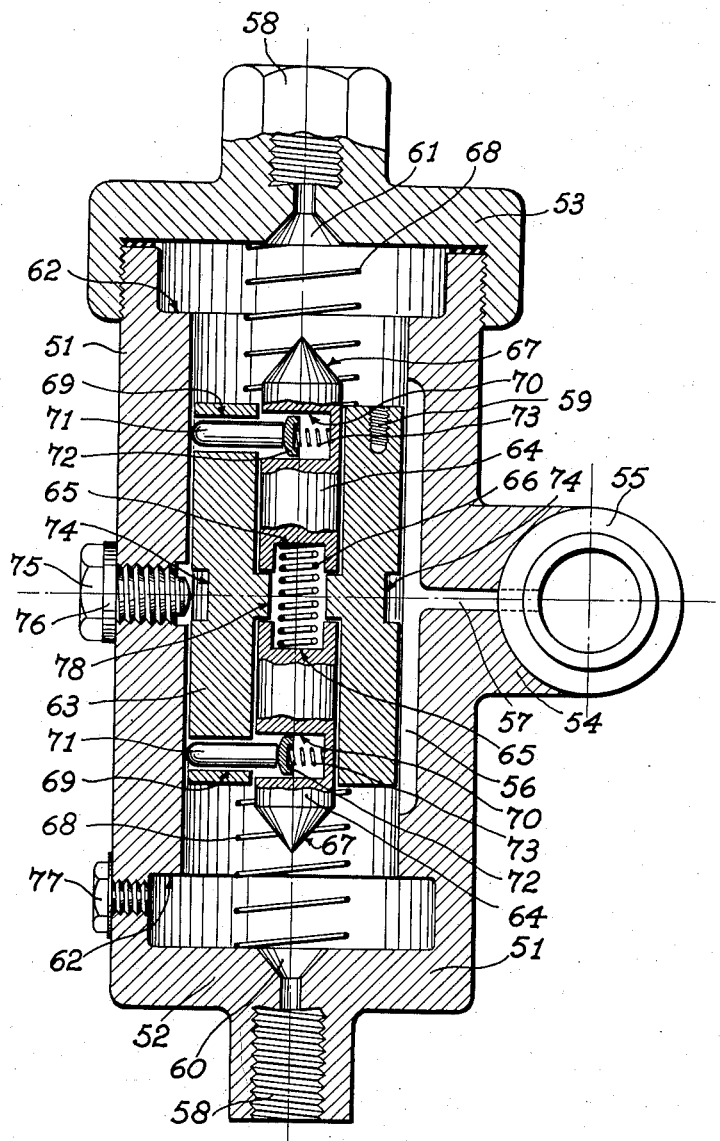
Fig. 2 is a similar sectional view of another embodiment of the invention.

The embodiment shown in Fig. 2 comprises a main hollow cylindrical body 51 closed by a bottom 52 integral therewith at one end, and by a cover 53 tightly screwed on the other end. From the middle of the cylindrical wall of body 51 a large nozzle 54 projects outwardly, this nozzle communicating with the interior of said body 51 and having a flange 55 for direct attachment to the main cylinder of the pump that feeds hydraulic fluid to the brake assembly, or to a pipe which connects nozzle 54 to said pump in fluid tight relationship therewith. A wide groove 56 is provided in the inner surface of the portion of the cylindrical wall of hollow body 51 wherefrom nozzle 54 projects, groove 56 extending longitudinally of said wall and having in the middle a hole 57 which communicates with the inside of nozzle 54.

A spout 58 projects from bottom 52, and a spout 58 projects from cover 53, a pipe for the fluid being connected with each spout 58 and communicating with the cylinders of a pair of hydraulic brakes on the vehicle. The geometrical axis of each spout 58 is in alignment with the axis of cylindrical body 51, the latter body communicating with them through holes 60, 61 in the center of bottom 52 and cover 53, respectively. These holes are each shaped as a frustum of cone with the larger opening in the inner face of the bottom and cover, respectively. A short portion of body 51 adjacent bottom 52 and cover 53 is of larger inner diameter than the main portion of said body; the difference between the two diameters forms a circular shoulder 62 in a plane normal to the axis of body 51, near each end of this body.

A piston 63 a little shorter than groove 56 and having no stem is slidably mounted in main body 51 in fluid tight relationship therewith, and the interval between bottom 52 and the terminal plane face of piston 63 facing it is the same as the interval between cover 53 and the other face of piston 63 in the idle position of this piston, owing to the fact that the pressure of hydraulic fluid is the same on both faces. Piston 63 has an axial bore formed with a short narrow portion 78 in the middle. Two equal pins 64 are each slidably mounted in one of the two equal portions of the piston bore which are of larger diameter. The inner end of each pin 64 engages one of the shoulders forming the narrow portion 78, and a recess 65 is provided in each of said ends, a strong spiral spring 66 being inserted in each recess 65. Each pin 64 projects from the respective end of piston 63 with a short cylindrical portion and conical point 67, the size and shape of this point being substantially the same as those of holes 60, 61, whereby the operation of the device will cause the pin to tightly close the respective hole 60 or 61 which it faces in its idle position. The portion of each pin 64 projecting from piston 63 is surrounded by a spiral spring 68 between bottom 52 or cover 53 and the respective end of piston 63 to keep the pin on the axis of cylindrical body 51 during the operation of the device.

Closely adjacent each end of the pistons, a bore 69 is provided, the axis of which has a normal direction to the axis of body 51, and pin 64 has a blind bore or hole 70 which forms a continuation of bore 69 but is of a larger diameter. A slider 71, a little longer than bore 69, is received in this bore and abuts against the inner surface of main body 51 at one end, the other end projecting into hole 70 and engaging the convex side of a cap 72 the other side of which, of concave shape, is biased by one end of a small spiral spring 73 whose other end abuts on the bottom of hole 70.

Piston 63 has a neck 74 in the middle of its outer surface, and a threaded hole is provided in the wall of body 51 wherein a bolt 75 is screwed, the head of this bolt projecting from the outer surface of the wall. The point of bolt 75 may be inserted in neck 74, but is generally kept out of the neck, a washer 76 being interposed between said outer surface and the head of bolt 75. Another threaded hole is provided near bottom 52, a bolt 77 being screwed in this hole, with its head on the outer surface of the wall of body 51 and with its end flush with the inner surface of the larger diameter portion of the inner space in body 51 adjacent bottom 52.

In the idle condition, piston 63 as already mentioned, is in the position wherein the intervening space between bottom 52 and the piston face opposite is the same as the intervening space between cover 53 and the other face of the piston, both pins 64 projecting from the respective end of piston 63 to the same extent, and spring 66 being in the middle of the piston bore. The same amount of braking hydraulic fluid from nozzle 54 is supplied through bore 57 and groove 56 to the space between bottom 52 and the opposite piston end, and to the space between cover 53 and the opposite piston end, thus establishing a continuous communication of the hydraulic fluid supply pump with the vehicle brake cylinders, and exerting the same pressure on both ends of piston 63 as well as on the two pins 64; piston 63 and pins 64 will therefore remain in the above mentioned position. Should a failure of one brake occur, the hydraulic fluid therein will flow out and disperse, and the pressures on the two ends of piston 63 will be unbalanced, since the pressure on the piston end facing the spout 58 which communicates with the damaged brake will be almost zero, while the other end will still be subjected to normal fluid pressure. This pressure will therefore suddenly push piston 63 toward bottom 52 or cover 53. During this sudden rush of piston 63, the slider 71 therein which is near said end will be displaced owing to the action of spring 73 as soon as the orifice of the bore wherein it is inserted reaches the larger diameter portion within cylinder 51. This slider will engage the associated shoulder 62 in such a way as to prevent a return of piston 63. At this point, pin 64 projecting from the end in question of piston 63 is no longer held by slider 71 and is pushed into the associated truncated-conical hole 60 or 61, thus closing it and cutting off the communication of the hydraulic fluid supply pump with the cylinder for the damaged brake. In this way the pair of undamaged brakes to which the other spout 58 leads will still be supplied with the fluid in the normal way and will remain fully effective. Spring 68 between bottom 52 or cover 53 and the respective end of piston 63 will be fully constricted in the space between said bottom or cover and piston end.

It will be understood that the narrow portion 78 of the bore in piston 63 has considerable importance in the operation of the present embodiment. Should, for instance, the hydraulic fluid pressure be lacking in the space between piston 63 and bottom 52, the pin 64 which projects from the other end of the piston will be subjected to the pressure of the fluid on this end of piston, thus compressing spring 66. Therefore, the strength of this spring, in combination with the engagement between hole 60 and end 67 of the respective pin 64 will give rise to a clamping action on the pair of pins 64 and spring 66 between them. The cylindrical surface of the slider 71 which is near bottom 52 will be pressure against the wall of bore 69 wherein it is inserted. Therefore, it is possible that although the orifice of bore 69 is offset from the inner surface of body 51, the strength of spring 73 biasing the slider may not be sufficient to push the latter out of bore 69. The narrow portion 78 of the bore in piston 63 will, however, prevent the pin 64 which is subjected to the pressure of hydraulic fluid, from moving toward the other pin 64 and compressing spring 66 which will then be free to stretch. This overcomes the pressure on the other pin 64 and the slider 71 which is carried by this pin can freely move within its own bore, and may be pushed out by its own spring 73 very easily.

To reset the device, a different method is employed according to whether hole 60 in bottom 52 or hole 61 in cover 53 has been closed. In the first instance, cover 53 and bolt 77 are removed, the point of a screwdriver or other suitable tool is introduced into hole 59 which is provided in the end of piston 63 facing cover 53, and the piston is turned until the slider 71 which projects therefrom near bottom 52 faces the threaded hole in the wall of body 51 provided with bolt 77, the latter having been removed. Then, by tilting the device, slider 71 can be removed from the bore, and it will be possible to draw piston 63 out through the threaded end of body 51 which has been freed of cover 53. Slider 71 is put in place again, and piston 63 is again inserted in body 51, which is then closed by cover 53.

Should, however, the operation of the device cause hole 61 in cover 53 to be closed, the method will be still easier, since it will be sufficient to remove cover 53 to make it possible to remove piston 63 and replace the slider 71 which is near the end of piston 63 facing cover 53, following which body 51 is again closed.

In either instance, after the normal positions of the parts of the device have been restored, it will be necessary to remove the air from the brake hydraulic fluid and to this end bolt 75 is unscrewed, washer 76 is removed, and bolt 75 is screwed in again until its point is inserted in neck 74; in this way piston 63 will become immovable. This is necessary, since the two faces of piston 63 are subjected to different pressures when air is removed from the fluid, in the same way as if a failure had occurred in a brake. After removal of the air, bolt 75 is unscrewed, washer 76 is put in place again, and said bolt is screwed in again to its normal position.

It may be noted that the device of the invention, in either form as hereinbefore described, may be incorporated with the main cylinder of the pump for the brake hydraulic fluid.

While two specific embodiments illustrative of the present invention have been described, modifications may be made therein without departing from the spirit and scope of the present invention. It will be understood, therefore, that such changes and modifications are contemplated as are within the scope of the appended claims.

What we claim is:

1. A safety device for a pressure fluid system having separate branches, said device comprising a hollow body having a cylindrical bore and outlets communicating with opposite extremities of said bore and with said branches, said body being provided with a centrally located inlet opening and an axially extending internal groove connected to said inlet opening and opening into said bore, a piston member in said bore and having an axial extent less than that of said groove, means yieldably maintaining said piston member centrally disposed with respect to said bore so that the latter is divided into separate sections and whereby fluid can pass from the inlet opening through said groove and via said sections to said outlets, displaceable means operatively disposed with respect to said outlets for closing the same, and locking means for rendering said displaceable means ineffective to close the outlets, said locking means responding to an axial displacement of the piston member due to a difference of fluid pressure in said sections for releasing the displaceable means associated with one of the outlets for closing the same.

2. A device as claimed in claim 1 wherein the outlets of said body are perpendicular to the axis of the cylindrical bore and the body is provided with further bores coaxially aligned with said outlets, said displaceable means comprising pistons in said further bores and springs engaging the pistons and urging the same towards said outlets to close the latter.

3. A device as claimed in claim 2 wherein the body is further provided with axial openings extending from said sections into said further bores, said locking means comprising trigger members radially displaceable into said pistons, springs urging said trigger members partially out of said pistons into said axial openings to lock said pistons in position in said further bores, and pins slidably accommodated in said axial openings and extending out of the same for selective engagement by said piston member whereby the trigger members are displaced and said pistons released.

4. A device as claimed in claim 3 wherein said piston member comprises oppositely extending, axially projecting peripheral flanges for closing off said groove.

5. A device as claimed in claim 4 wherein said piston member includes opposite extending central protrusions for engaging said pins.

6. A device as claimed in claim 5 wherein said body is provided with a hole centrally opening into said cylindrical bore, said device further comprising a rod extending through said hole into said cylindrical bore and a spring engaging the rod and urging the same into said cylindrical bore whereby the piston member upon displacement is prevented from effecting a return movement.

7. A device as claimed in claim 6, wherein said rod comprises a shaft of electrically insulating material and a head of electrically conductive material, said body being of metal, said device further comprising a contact coupled to said body, and a contact coupled via the latter said spring to said head, a movement of said head against said body completing an electrical circuit between the contacts.

8. A device as claimed in claim 1 wherein said locking means and displaceable means are mounted on said piston member.

9. A device as claimed in claim 8 wherein said outlets and cylindrical bore are coaxially aligned.

10. A device as claimed in claim 9 wherein said displaceable means comprises axially aligned pistons slidable within said piston member, the pistons being coaxial with said outlets.

11. A device as claimed in claim 10 comprising a spring between said pistons.

12. A device as claimed in claim 11 wherein said piston member is provided with an axial bore accommodating said pistons, said bore having a centrally located narrowed section limiting movement of said pistons.

13. A device as claimed in claim 12 wherein the pistons are provided with radial openings, said locking means comprising spring loaded plungers in said radial openings and extending radially through said piston member, said cylindrical bore having enlarged chambers at its opposite extremities whereby the plungers are adapted to prevent return movement of the piston member after a determinable displacement of the latter.

References Cited in the file of this patent

UNITED STATES PATENTS

| | | |
|---|---|---|
| 1,936,504 | Foster et al. | Nov. 21, 1933 |
| 2,239,348 | Wirtanen et al. | Apr. 22, 1941 |
| 2,410,202 | Crawford | Oct. 29, 1946 |
| 2,531,274 | Johnson | Nov. 21, 1950 |
| 2,568,311 | Wise et al. | Sept. 18, 1951 |
| 2,879,791 | Hollmann | Mar. 31, 1959 |